United States Patent [19]

Gerber

[11] Patent Number: 4,793,520

[45] Date of Patent: Dec. 27, 1988

[54] FLAVOR DISPENSING DEVICE

[76] Inventor: Ernest C. Gerber, 10 Londonderry Ct., Danville, Ind. 46122

[21] Appl. No.: 57,966

[22] Filed: Jun. 3, 1987

[51] Int. Cl.[4] .............................................. B67D 5/56
[52] U.S. Cl. ................................ 222/145; 222/146.6; 222/148; 222/129.1; 366/168
[58] Field of Search ...................... 222/145, 129, 146.6, 222/148, 504, 135, 129.1, 144.5; 366/168, 167, 150; 62/392

[56] References Cited

U.S. PATENT DOCUMENTS

| 2,262,293 | 3/1940 | Lilja et al. | 225/27 |
|---|---|---|---|
| 2,736,534 | 2/1956 | Atkins | 62/306 |
| 2,894,377 | 7/1959 | Shikles, Jr. et al. | 62/306 |
| 3,068,075 | 12/1962 | Boekemeier | 366/150 X |
| 3,224,740 | 12/1965 | Kuehn et al. | 259/8 |
| 3,330,129 | 7/1967 | Halverson et al. | 62/179 |
| 3,403,523 | 10/1968 | Bauer et al. | 62/392 X |
| 3,460,716 | 8/1969 | Thomas | 222/129.1 |
| 3,460,717 | 8/1969 | Thomas | 222/145 X |
| 3,479,835 | 11/1969 | Lane et al. | 62/135 |
| 3,517,524 | 6/1970 | Fiedler | 62/188 |
| 3,606,860 | 9/1971 | Dunn, Jr. | 366/167 X |
| 3,828,572 | 8/1974 | Calim | 62/340 |
| 3,830,407 | 8/1974 | Wierlo | 222/145 |
| 4,378,164 | 3/1983 | Manfroni | 222/135 X |
| 4,580,905 | 4/1986 | Schwitters et al. | 222/145 X |
| 4,582,226 | 4/1986 | Doak | 222/148 |
| 4,635,825 | 1/1987 | Tulasne | 222/145 X |
| 4,643,335 | 2/1987 | Carnisio | 222/145 X |

Primary Examiner—Joseph J. Rolla
Assistant Examiner—Nils E. Pedersen
Attorney, Agent, or Firm—Woodard, Emhardt, Naughton, Moriarty & McNett

[57] ABSTRACT

A flavor dispensing device usable on machines for dispensing frozen foods, such as ice cream. The flavor dispensing device is suitable to be retrofitted on existing food dispensing machines below the dispensing spigot. One embodiment includes a syrup stem protruding inwardly into the food/flavor mixing chamber. This stem may have both an opening in the central portion and the perimeter portion of the mixing chamber, resulting in syrup being deposited in the center and the perimeter of the ice cream flow. A rotor in the chamber provides mixing, and in one embodiment the rotor is tangentially driven and has a central aperture therein. A water flush system is provided to clean syrup and food from the various lines and ducts. The flavor dispensing device is readily removable for cleaning and servicing.

23 Claims, 7 Drawing Sheets

FLAVOR DISPENSING DEVICE

BACKGROUND OF THE INVENTION

This invention relates generally to the field of flavor dispensing devices, and more specifically to a device for providing a selection of flavors for a frozen food dispenser.

Frozen food dispensers for ice cream and the like are widely used. Several devices for providing a selection of flavors are known. For example U.S. Pat. Nos. 4,580.905, 4,378,164 and 4,643,335 disclose various approaches to solving the need of mixing one of several flavors with a base mix of ice cream. Several flavored syrup ducts feed into a mixing chamber for combining syrup and ice cream. Some devices use an axially driven rotor in the mixing chamber to mix the ice cream with the syrup which is added at the circumference of the mixing chamber. This provides for a swirl of syrup on the outer portion of the ice cream.

One problem associated with multi-flavored devices is that of flavor carry-over. Various approaches are discussed in column 1 of U.S. Pat. No. 4,580,905, including using different mixing chambers for different flavors, and using a water flush system to be used between uses of different flavors.

It is necessary to design such systems to be easily cleaned due to their use of perishable food products. As such, it is desirable to have easily removable component parts which may be easily cleaned.

Some devices use axial drive mixers to completely blend base ice cream mix with flavoring syrup. These devices introduce syrup at the edge of the mixing chamber, and then the shaft driven mixer blends the ice cream and syrup around the outside of the drive shaft, providing a homegeneous mix of base and syrup.

It is common among prior multi-flavored devices to be integrated into the structure of the ice cream machine. While this may provide some advantages, it also creates difficulty in retrofitting machines not having flavor selection. Also, cleaning of equipment can be more difficult in some of the prior devices.

In the interest of disclosure, the following U.S. Pat. Nos. may be considered: 4,378,164 to Manfroni; 3,224,740 to Kuehn; 2,736,534 to Atkins; 3,830,407 to Wierlo; 2,262,293 to Lilja; 4,643,335 to Carnisio; 3,828,572 to Calim; 3,517,524 to Fiedler; 3,330,129 to Halverson et al.; 3,479,835 to Lane et al.; 4,635,825 to Tulasne; and 2,894,377 to Shikles, Jr., et al.

SUMMARY OF THE INVENTION

According to one embodiment, the present invention provides a device for combining one of a plurality of syrups with a frozen confection comprising a rotor housing having a mixing chamber, a confection inlet to the mixing chamber, and a confection outlet from the mixing chamber, the rotor housing including not more than one syrup duct means for delivering syrup into the mixing chamber anhd a rotor positioned in the mixing chamber, the rotor having a central aperture therein. Also included are means for driving the rotor; a plurality of syrup supply lines operably coupling the duct means to respective ones of the plurality of syrups; and means for pumping a syrup selected from the plurality of syrups through a corresponding one of the syrup supply lines and the syrup duct means and into the mixing chamber.

According to another embodiment, the present invention provides a device for combining one of a plurality of syrups with a frozen confection comprising a rotor housing having a mixing chamber, a confection inlet to the mixing chamber, and a confection outlet from the mixing chamber, the mixing chamber including a central portion and circumferential portion radially outward thereof. Also included are a rotor positioned in the mixing chamber; means for driving the rotor; an inwardly protruding syrup stem having a first syrup outlet located in the central portion of the mixing chamber, the stem further including a syrup duct located therein; at least one syrup supply line operably coupled to the syrup duct; and means for pumping a syrup selected from the pluraltiy of syrups through the syrup supply line and the syrup duct and into the mixing chamber.

According to another embodiment, the present invention provides a flavor dispensing device mountable below a frozen confection machine outlet comprising a removable rotor housing having a mixing chamber, a syrup duct menas for delivering a syrup into the mixing chamber, a confection inlet to the mixing chamber, and a confection outlet from the mixing chamber. Also included are means for coupling the rotor housing beneath the outlet of the frozen confection machine, wherein the inlet to the mixing chamber is operably coupled to the outlet of the frozen confection machine by the means for coupling; a rotor positioned in the mixing chamber; means for tangentially driving the rotor; at least one syrup supply line operably coupled to the syrup duct means; and means for pumping a syrup through the syrup supply line and the syrup duct means and into the mixing chamber.

A general object of the present invention to provide an improved flavor dispensing device.

It is another object of the present invention to provide a device for combining flavoring syrup both on the interior and the perimeter of an ice cream cone.

It is another object of the present invention to provide an ice cream cone with an improved appearance, including a decorative outer striping of colored syrup.

It is another object of the present invention to provide an improved system for providing a selection of flavoring syrup to be added to a base mix of ice cream.

It is another object of the present invention to provide syrup delivery to both the interior and visible exterior of an ice cream cone.

It is an object of the present invention to provide a syrup stem, useful in accomplishing the objects of the invention.

It is another object of the present invention to provide a multi-flavored syrup dispenser which may be easily retrofitted to existing ice cream machines.

It is another object of the present invention to provide a flavor dispenser which may be easily disassembled for cleanding and servicing.

It is another object of the present invention to provide a multi-flavor dispenser having a water flush system.

It is another object of the present invention to provide a flavor dispenser with a tangentially driven rotor for mixing syrup and ice cream.

It is another object of the present invention to provide an improved mixing rotor having a central aperture.

These and related objects of the invention will become more apparent upon reading the following detailed description of the preferred embodiment in conjunction with the accompanying drawings.

DESCRIPTION OF THE PREFERRED EMBODIMENT

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 1:
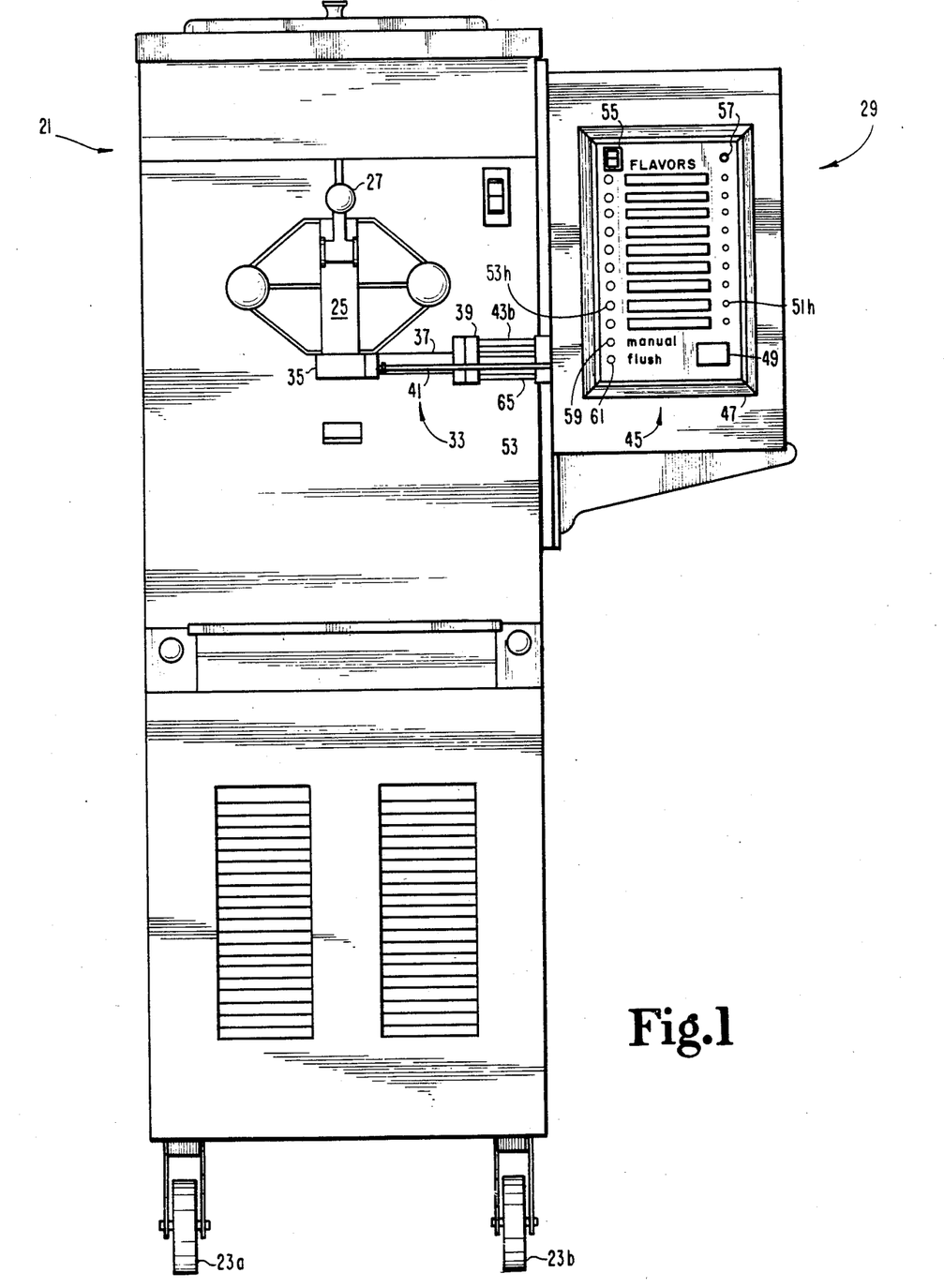
FIG. 1 shows a front view of an ice cream machine having a flavor dispensing device of the present invention attached hereto.
Figure 2:
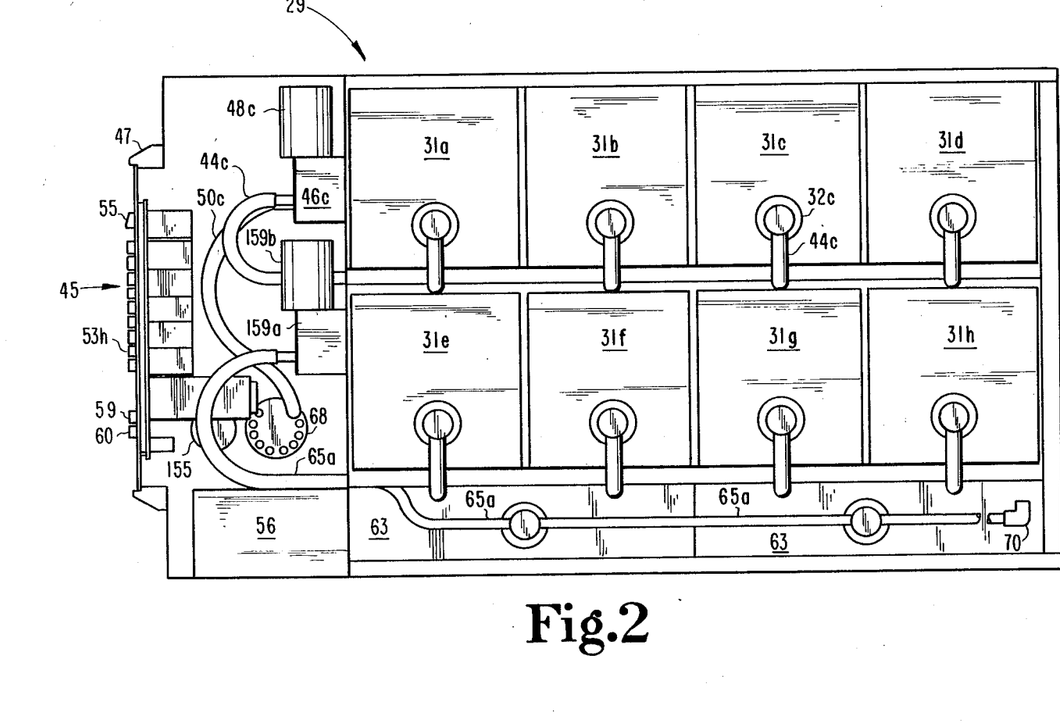
FIG. 2 shows a side partial cutaway view of the syrup cabinet shown in FIG. 1.

Referring now to FIGS. 1 and 2, ice cream machine 21 is a standard ice cream dispensing machine, such as machines offered by the Sani-Serv Corporation of Indianapolis, Ind., including Model Numbers: 407E, 407EFM, 401, 461, 408E, 468E, 414E, 421E, 521ET, 424E, 524ET, 587ET, and 507ETFM. Other similar machines, such as machines offered by Taylor Freezer Company of Rockton, Ill., (Model Numbers: 320, 321, 325, 750, 751, 755, 8752, 338, 339, 754 and 8756), and by Stoelting Corporation of Kiel, Wis., (Model Numbers: 2111, 2112-C, 2112-S, 3111, 3112-C, 3112-S, 3211, 3212C, 3212S, 217, 218, 221, 225 and 227) for example, are also suitable for being retrofitted with the present invention. The ice cream machine is mounted on wheels 23a and 23b and has an ice cream dispensing spigot 25 which delivers a frozen food confection, such as ice cream, when lever 27 is pulled downward. When lever 27 is pulled downward, a valve is opened an a pump is actuated, delivering a base mix of ice cream out of spigot 25. Syrup cabinet 29 is mounted to the side of ice cream machine 21 and contains eight syrup magazines, 31a, 31b, 31c, 31d, 31e, 31f, 31g and 31h, each of which contains a flavored syrup to be combined with the frozen confection. Syrup cabinet 29 is an add-on part to the off-the-shelf ice cream machine.

Rotor valve assembly 33 couples syrup cabinet 29 with ice cream dispensing spigot 25. The rotor valve assembly is coupled below the spigot and provides flavor mixing with the ice cream after it has exited the ice cream machine's spigot. The rotor valve assembly includes rotor housing 35, valve body 37, syrup line adaptor 39, and flexible drive shaft 41. Also, syrup lines, such as syrup line 43b, act as a conduit between syrup magazine, such as syrup magazine 31b, and rotor housing 35. These syrup lines are typically made of flexible plastic tubing.

Flavor control panel 45 includes control panel frame 47 and several control switches and "syrup out" light 49. There are also eight flavor selector switches, such as flavor selector switch 53h, and corresponding flavor indicator light 51h. Flavor system on/off switch 55 controls the electrical power to the entire syrup cabinet 29. Reset button 57 is provided to reset a circuit breaker in the electrical system in the flavor control panel. Manual override switch 59 allows electrical power to be provided to the control panel when the ice cream pump in ice cream machine 21 is not activated. Flush switch 61 actuates a water flush from flush reservoir 63 to rotor housing 35 by way of flush hose 65. Flush hose 65a supplies water from reserviour 63 to flush hose 65 via a hose (not shown) between pump 159a and coupler 68 (FIG. 2). Other syrup magazines are similiarly coupled to coupler 68 with one pump and set of hoses for each flavor. Note that fitting 70 on hose 65a is adapted to fit to syrup magazine drain, such as drain 32c so the operator may flush syrup out of syrup line 44c by coupling fitting 70 with drain 32c.

Syrup from magazine 31c is drawn through line 44c by syrup pump 46c which is driven by motor 48c. The syrup then flows to coupler 68 by way of syrup line 50c, and then into rotor-valve assembly 33. Other syrup lines in syrup cabinet 29 perform substantially the same function with each having their own respective syrup magazines, pumps and motors, but are not shown for drawing clarity.

Power box/transformer 56 is disposed in the front bottom of the syrup cabinet and steps 120 volt electricity down to 24 volts for use by the pump motors, lights and solenoid 95. Wires 99a and 99b (see FIG. 3) are run through one of the ten holes in coupler 68. The electrical layout is further set forth in the description accompanying FIG. 17 below. Motor 155 provides power to drive shaft 41.

Figure 3:
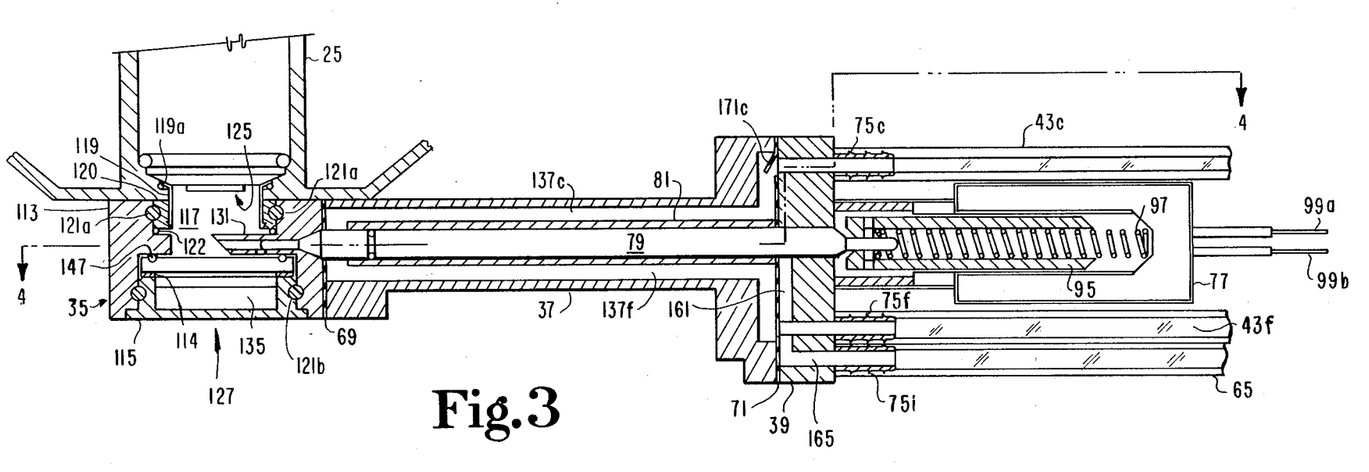
FIG. 3 shows a side sectional view of the rotor-valve assembly of the present invention taken along line 3—3 of FIG. 4.
Figure 4:
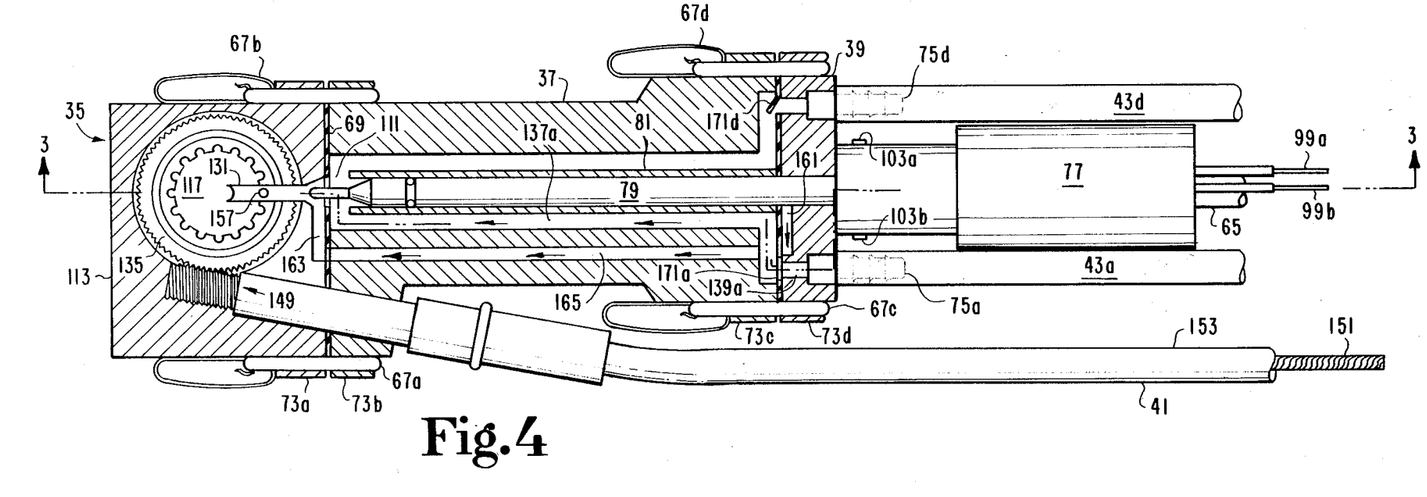
FIG. 4 shows a top partial sectional view of the rotor-valve assembly of FIG. 3 taken along lines 4—4 shown in FIG. 3.
Figure 5:
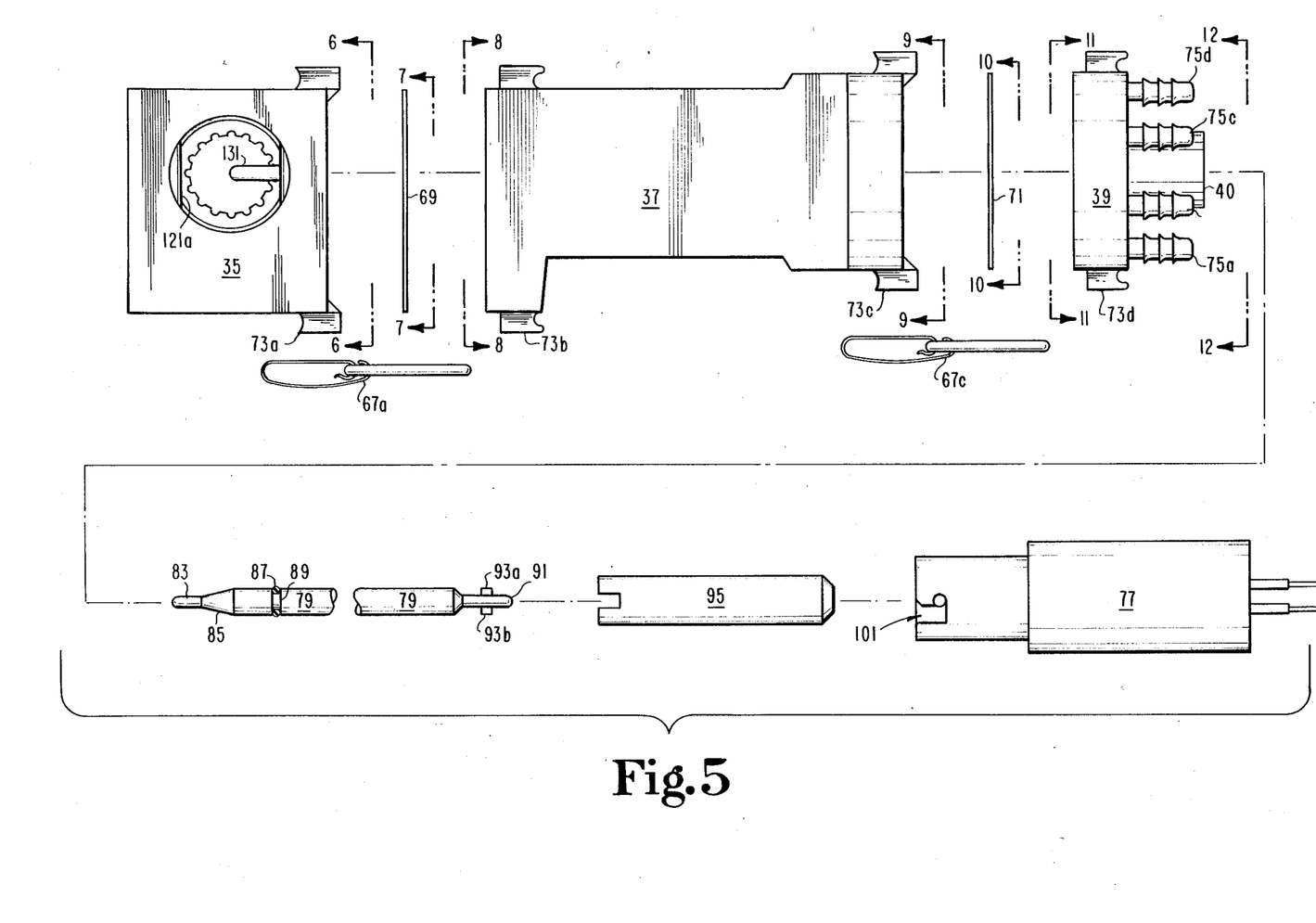
FIG. 5 shows an exploded top view of the rotor-valve assembly shown in FIG. 4.

Referring now to FIGS. 3–16, rotor housing 35 is coupled to valve body 37 by clamps 67a and 67b, with rubber gasket 69 sandwiched therebetween. Similarly, valve body 37 and syrup line adaptor 39 are coupled by clamps 67c and 67d with rubber gasket 71 sandwiched therebetween. Rubber gaskets 69 and 71 are soft, pliable rubber sheets, which when sandwiched between the respective parts of the rotor-valve assembly, provide a liquid tight seal to prevent leakage. The clamps 67a-d are buckle-type clamps which are readily snapped or unsnapped from hooks, such as hooks 73a, 73b, 73c and 73d, as seen in FIGS. 4 and 5. This allows for quick disassembly and easy cleaning of the rotor-valve assembly.

Syrup line adaptor 39 includes nine barbed nipples, such as 75a, 75b, 75c, 75d, 75e, 75f, 75g, 75h and 75i. Note that in FIG. 4, barbed nipples 75b and 75c are deleted for drawing clarity to better show solenoid body 77. Nipple 75i is a male fitting adapted to fit within flush hose 65 to provide flush water for cleaning of the system. The other eight nipples, 75a-h, are all shown in FIG. 12, radially positioned around the axial center of the syrup line adaptor. Flexible clear plastic syrup lines, such as syrup lines 43a and 43d (FIG. 4) and syrup lines 43c and 43f (FIG. 3) couple syrup line adaptor 39 with a respective one of the syrup magazines 31a-h, shown in FIG. 2. Note that lines such as line 43a, and drive 41 are flexible, allowing rotor body 35 to travel when coupled to ice cream machines having pivot rotating spigots, such as shown in U.S. Pat. No. 3,828,572.

Valve plunger 79 is positioned in valve plunger sleeve 81, which has an axial bore running longitudinally therein. Valve plunger 79 has a front needle 83, a frusto-conical surface 85, O-ring 87 seated in circumferential channel 89 and rear needle 91 which has radial tabs 93a and 93b affixed thereto (FIG. 5). Rear needle 91 is inserted into solenoid core 95 and then twisted, allowing tabs 93a and 93b to lock valve plunger 79 and solenoid core 95 into engagement into bayonet slots in solenoid core 95. For disassembly, the valve plunger is pushed toward the solenoid core, twisted and then pulled out. As seen in FIG. 3, solenoid core 95 includes spring 97, which acts in compression to urge the valve plunger longitudinally away from the solenoid core. The solenoid core is positioned in solenoid body 77, which has wires 99a and 99b providing 24 volt direct current thereto. Solenoid body 77 has two L-grooves, such as L-groove 101 (FIG. 5), which engages with a corresponding radial pegs, such as radial pegs 103a and 103b (FIG. 4), which are attached to hub 40 on line adaptor 39. In this way, solenoid body 77 is coupled with syrup line adaptor 39, and yet may be easily removed therefrom. Note that in FIG. 5, L-groove 101 is rotated 90° in relation to syrup line adaptor 39 for drawing clarity.

FIG. 3 illustrates the rotor-valve assembly with valve plunger 79 in a closed position; whereas, FIG. 4 shows valve plunger 79 in an open position. Valve plunger 79, as shown in FIG. 4, is longitudinally retracted away from rotor housing 35 by electrically energizing wires 99a and 99b, thus causing the solenoid to draw valve plunger 79 inwardly against the compressional action of spring 97. When the current is stopped, spring 97 urges valve plunger back in a closed position as shown in FIG. 3. Note that O-ring 87 provides a liquid seal to reduce or prevent syrup flow in the axial bore of valve plunger sleeve 81.

Figure 8:
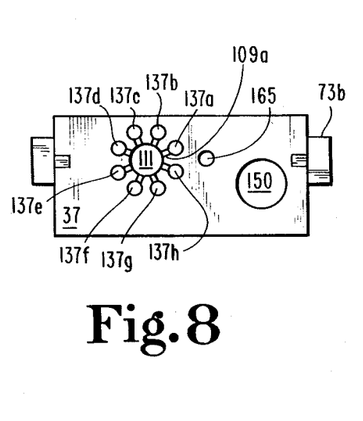
FIG. 8 shows a rear view of the valve body shown in FIG. 5 along line 8—8.
Figure 9:
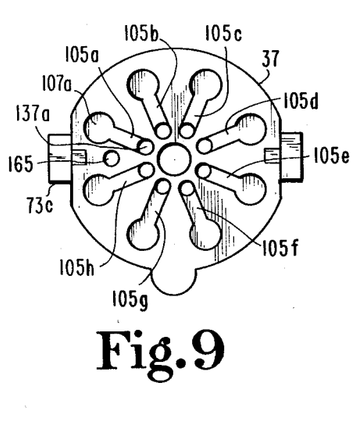
FIG. 9 shows a rear view of the valve body shown in FIG. 5 along line 9—9.
Figure 10:
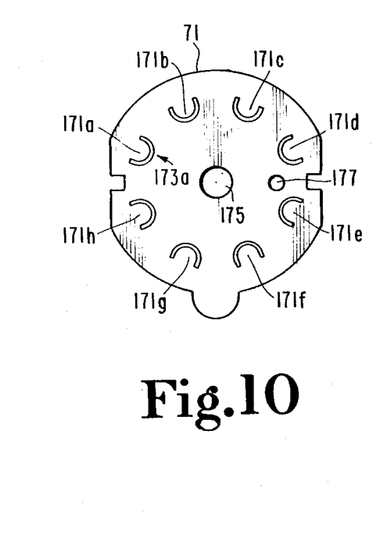
FIG. 10 shows a rear view of the gasket shown in FIG. 5 along line 10—10.
Figure 11:
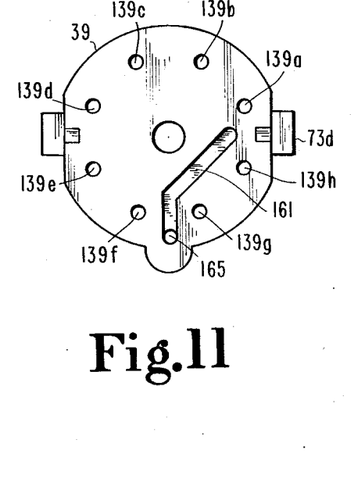
FIG. 11 shows a front view of the syrup line adaptor shown in FIG. 5 along line 11—11.
Figure 12:
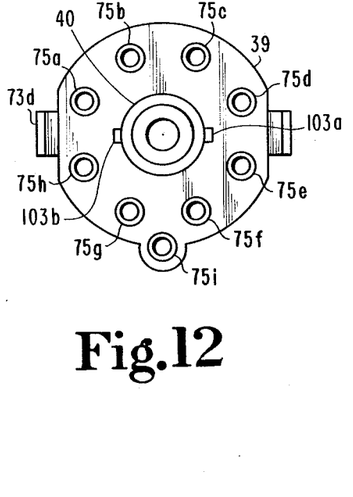
FIG. 12 shows a rear view of the syrup line adaptor shown in FIG. 5 along the line 12—12.

Syrup flow from a syrup magazine, such as syrup magazine 31a, is as follows. A pump is activated, causing syrup from magazine 31a to flow into syrup line 43a. The syrup next flows through barbed nipple 75a and into syrup line adaptor 39, which has syrup duct 139a. Note that, as seen in FIG. 11, there are eight syrup ducts 139a, 139b, 139c, 139d, 139e, 139f, 139g and 139h, which correspond to the barbed nipples 75a-h. shown in FIG. 12. The syrup next flows through gasket 71, which in addition to providing liquid sealing, also acts as a check valve. This check valve function is accomplished by the use of flaps, such as flap 171a, which is formed by a crescent cut, such as creseent cut 173a. Note that there are eight flaps, one corresponding to each of the syrup ducts 139a14 h, and these flaps are denoted as 171a-h, as shown in FIG. 10. There is also vavle plunger hole 175 and flush hole 177. As seen in FIG. 4, these check valve flaps may be open like flap 171d or closed like flap 171a. As the syrup is pumped through duct 139a, flap 171a will open, allowing unidirectional flow of the syrup. The syrup next flows into rear radial channel 105a towards syrup duct 137a. Note that, as shown in FIG. 9, there is flap receiving chamber 107a, which has a larger diameter than syrup duct 139a shown in FIG. 11. This flap receiving chamber allows room for flap 171a to open, while the smaller diameter of syrup duct 139a provides a bearing surface therearound on which flap 171a can bear to resist back-flow of syrup. There are corresponding flap receiving chambers, as shown in FIG. 9, for each of the eight syrup ducts. Similarly, there are eight ducts, such as duct 137a, radially inward of the flap receiving chambers and radially outward of the valve plunger bore. The syrup continues in duct 137a along the flow arrows, as shown in FIG. 4, and into front radial channel 109a, as shown in FIG. 8. Front radial channel 109a is a deep longitudinal slot providing syrup into valve chamber 111, shown in FIGS. 4 and 8. Note that in FIG. 8, there are eight front radial channels corresponding to each of the respective syrup ducts 137a-h. From the foregoing, it is seen how syrup is delivered from syrup magazine 31a to valve chamber 111. The process if substantially similar for the other seven syrups contained in their respective syrup magazines along their respective syrup lines and syrup ducts.

Note that valve chamber 111 is defined by the space previously occupied by the frusto-conical front portion of valve plunger 79 and the front portion of the valve plunger's body, when such valve plunger is in a longitudinally retracted position, as shown in FIG. 4. In FIG. 3, valve chamber 111 is completely occupied by valve plunger 79.

Figure 13:
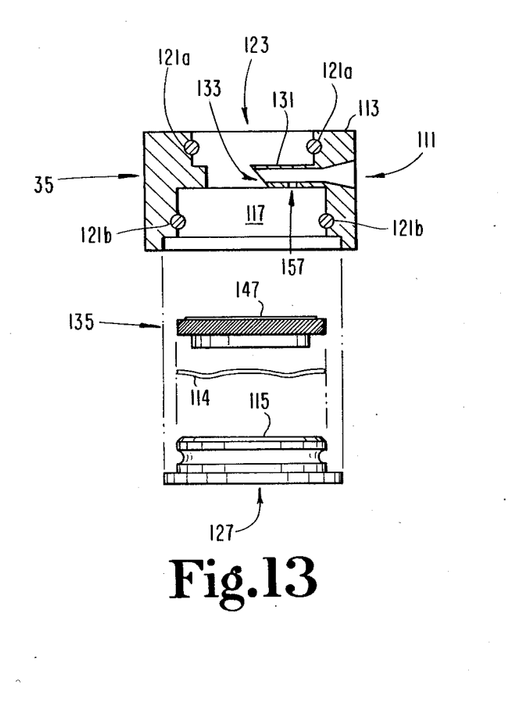
FIG. 13 shows an exploded side view of the rotor housing and rotor gear in partial section.

Syrup in valve chamber 111 next flows into rotor housing 35. Rotor housing 35 includes rotor housing body 113 and rotor housing design disk 115 (FIGS. 3 and 13). Design disk 115 is held in place in the bottom of rotor body 113 by U-bar 121b which is substantially similar to U-bar 121a discussed below. Note, unlike U-bar 121a, U-bar 121b is inserted behind rotor body 113 (as seen in FIG. 3) so as not to interfere with worm drive 149. Rotor housing 35 has a mixing chamber 117 centrally located therein and defining a substantially vertical cylinder therein. Triple wave spring washer 114 provides a snug, yet resilient bearing between rotor gear 135 and design disk 115.

Rotor housing body 113 is suspended below ice cream dispensing spigot 25 of ice cream machine 21. The housing body is coupled to the spigot by coupler fitting 119, ring 120 and U-bar 121a (see FIG. 16). Coupler fitting 119 is seated the spigot mouth 125 as shown, or may be attached by threading, welding, snap-on means, or other sutiable means for attaching to the spigot. In ice cream machines having obstructions, such as a star-shaped die in spigot mouth 125, it is necessary to bore out an opening suitable to receive fitting 119. Couler fitting 119 may vary in geometry, depending on the make and model of the ice cream machine being fitted with the present invention, and its shape is a matter of design expedience. The coupler fitting 119 has a vertical axial bore therethrough to allow ice cream to flow from spigot mouth 125. O-ring 119a, as well as glue or other bonding material, provides a tight seal between fitting 119 and spigot 25. Ring 120 is snapped around fitting 119 and may be fused thereto. Rotor housing body 113 is joined to ring 120 by positioning the housing body around the ring and laterally inserting U-bar 121a (See FIG. 3). O-ring 122 provides a seal. U-bar 121a is inserted into two parallel transverse bores defined by channels machined into ring 120 and rotor housing body 113. In this way, the rotor-valve assembly may be readily removed from spigot 25 merely by removing U-bar 121a. This facilitates cleaning and inspection of the rotor-valve assembly.

Figure 14:
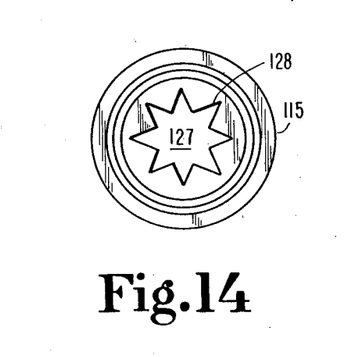
FIG. 14 is a top view of the rotor gear housing design disk.

Mixing chamber 117, as seen in FIG. 13, has a confection inlet 123 through which frozen confection, such as ice cream, enter the mixing chamber from spigot mouth 125. Correspondingly, confection outlet 127 is in the bottom of rotor housing 35 and is the outlet from which the ice cream combined with flavored syrup flows. As seen in FIG. 14, rotor housing design disk 115 shows confection outlet 127, which is an aperture therein. The confection outlet is star-shaped with several pointed tips 128 as shown.

Rotor housing body 113 has stem 131 integrated therein and protruding from a point on the circumferential outer wall of mixing chamber 117 radially inward to the center of the mixing chamber. Stem 131 has a central orifice or opening 133, which is an outlet for the syrup duct contained in stem 131. In the preferred embodiment, the stem is tubular, and central orifice 133 is defined by a diagonal sectional cut in the stem, providing a downward taper. Stem 131 and central orifice 133 are positioned in the mixing chamber below confection inlet 123 and above rotor gear or rotor 135 (and above outlet 127).

Figure 15:
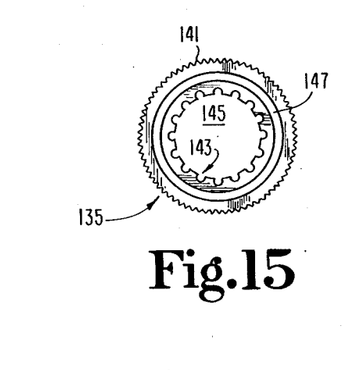
FIG. 15 is a top view of the rotor gear.
Figure 16:
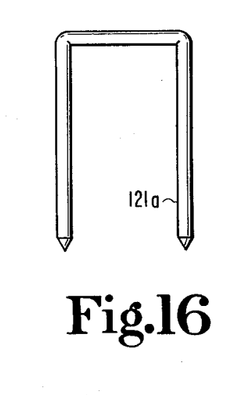
FIG. 16 is a top view of a U-bar utilized in an embodiment of the present invention.

Rotor gear 135 is shown independently in FIG. 15 and has outer gear teeth 141, inner teeth 143 and defines central aperture 145 radially inward of inner teeth 143. Teflon coated O-ring 147 provides a seal between rotor 135 and rotor housing body 133, as shown in FIG. 3. As shown in FIG. 4, rotor 135 is tangentially driven by worm drive 149, which is powered by flexible drive shaft 41 having drive shaft core 151 and drive shaft sheath 153. The tangential drive provided by worm drive 149 enables rotor 135 to be rotated within mixing chamber 117, while leaving central aperture 145 free and clear of any drive mechanism, such as an axial drive mechanism. In this arrangement, ice cream is free to flow vertically downward from spigot mouth 125 through the mixing chamber and out confection outlet 127. Furthermore, stem 131 and corresponding central orifice 133 may be located above central aperture 145 of the rotor, without interference from an axial drive shaft. Note that tangential drive of rotor 135 may also be accomplished by other suitable means, such as the use of a bevel gear or tangential gear co-planar with rotor 135. Drive shaft core 151 is rotably powered by drive shaft motor 155 shown in FIG. 2.

Syrup stem 131, in addition to having central orifice 133, also has perimeter orifice 157, providing the second outlet for syrup from the duct in the stem. As seen in FIG. 4, perimeter orifice 157 is positioned in vertical alignment with inner teeth 143 of rotor 135. In this way, perimeter orifice 157 functions to deposit syrup along the outermost portion of the ice cream flowing through central aperture 145 of the rotor. Central orifice 133 further functions to supply additional flavored syrup to the central core or the ice cream flowing downwardly through mixing chamber 117. Mixing chamber 117, being a space, is divided into two spacial portions denoted as a central portion and a circumferential portion. The circumferential portion of mixing chamber 117 is defined as that annular portion of the mixing chamber in which syrup will be deposited on the ice cream, such that the syrup is visible on the outside of the ice cream as it exits confection outlet 127. In a complimentary fashion, the central portion of mixing chamber 117 is defined as that portion which is not part of the circumferential portion and is radially inward thereof. The central portion is provided syrup by central orifice 133, injecting syrup into the center of the ice cream which is not visible in the finished, flavored ice cream product.

As syrup is added to the ice cream in mixing chamber 117, rotor 135 is rotated at a speed typically ranging between 300 and 400 rpm, with a preferred speed believed to be about 350 rpm. Such rotation encircles the ice cream with syrup from perimeter orifice 157. As the syrup coated ice cream is extruded through tips 128 of confection outlet 127 (see FIG. 14), the flavored, and typically colored, syrup is extruded at the several tips, such as tip 128. The result is a serrated ice cream extrusion with a striping effect accomplished by the syrup on the outer tips of the serration, and base ice cream (typically white) appearing on the radially inwardmost portion formed by confection outlet 127. Thus, the finished product preferably is an ice cream cone with an attractive, decorative stripe appearance. Furthermore, in addition to the perimeter striped appearance, flavored syrup is also provided in the central core of the ice cream cone due to the syrup injected from central orifice 133.

Figure 6:
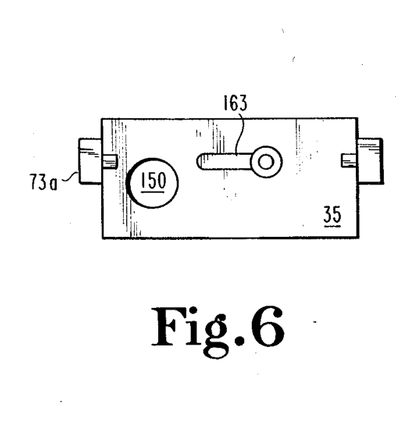
FIG. 6 shows a rear view of the rotor body of FIG. 5 shown along line 6—6.
Figure 7:
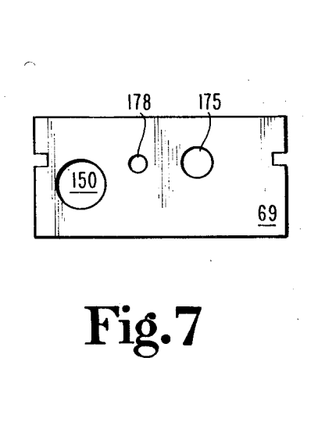
FIG. 7 shows a rear view of the gasket shown in FIG. 5 along line 7—7.

Worm drive 149 rotates within rotor housing 35 and valve body 37 inside of drive bore 150 shown in FIGS. 6, 7 and 8.

When the operator is finished dispensing ice cream, the ice cream machine is shut off with lever 27. This shuts off current through wires 99a and 99b. and thus spring 97 urges valve plugner 79 into valve chamber 111. The valve plunger displaces residual syrup remaining in the valve chamber, and front needle 83 of the valve plunger at least partially displaces residual syrup in the duct of stem 131.

The operator may flush valve chamber 111, stem 131 and mixing chamber 117 with a water flush between uses to reduce or prevent flavor carry-over between ice cream cones of different flavor. This is effected by activating manual override switch 59 and flush switch 61 as shown in FIG. 1. This activates flush pump 159a (driven by motor 159b) which draws water from flush reservoir 63 and pumps it through flush hose 65. As seen in FIG. 3, flush hose 65 is coupled with barbed nipple 75i which communicates the flush hose with flush duct 165. This flush duct includes transverse channel 161 (shown in FIG. 11) which is that segment of the flush duct in syrup line adaptor 39 which accommodates for the non-alignment of nipple 75i and that portion of the flush duct in valve body 37. (See also FIG. 4). Note that in FIG. 10, gasket 71 has flush hole 177 providing a flow of the flush water therethrough. The flush water continues through duct 165 in valve body 37, through gasket 69's flush hole 178 (see FIG. 7) and into transverse channel 163. Transverse channel 163 is incorporated in rotor housing body 113 and communicates flush duct 165 with valve chamber 111. Flush water flows into the valve chamber, through the duct of stem 131 and into mixing chamber 117. During the flush, worm drive 149 rotates rotor 135 causes a swirling, cleaning action in mixing chamber 117. Thus, the valve chamber, stem and mixing chamber are flushed of residual syrup which could otherwise cause flavor carry-over. Note that the flush water in valve chamber 111 does not back-flow in syrup ducts 137a–h because of the presence of residual syrup therein and the presence of flaps 171a–h acting as check valves.

Figure 17:
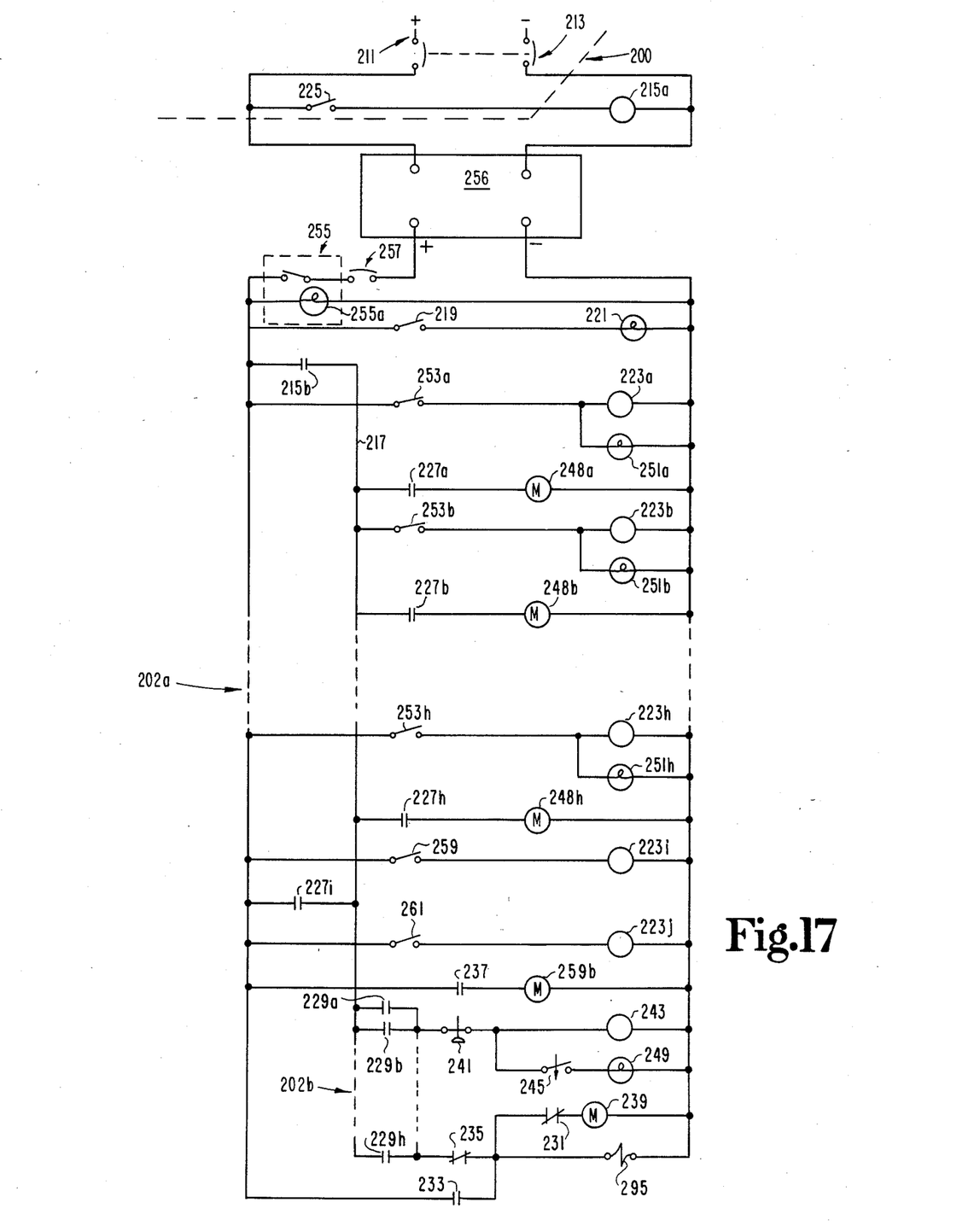
FIG. 17 is a schematic diagram of the electrical system utilized in the present invention.

Referring now to FIG. 17, the best mode electrical schematic used in the present embodiment is shown as a suitable approach for controlling the present invention, while not being necessary to practicing the invention. 120 volt alternating current is provided at power source 211 to the ice cream machine. Circuit breakers 213 are provided. Spigot switch 225 is activated when lever 27 (see FIG. 1) is actuated to dispense ice cream. Relay coil 215a provides for contact of relay contact 215b. Relay coil and contact 215a, 215b are in the preferred embodiment an Idec Relay, model no. RH1B-UT-120VAC. Contact 215b allows current to flow through line 217 when flavor system on/off switch 255 (substantially corresponding to flavor switch 55 on FIG. 1) is closed. Switch 255 (typically Microswitch-illuminated on-off switch, model no. MML24KK-2-AA01H-LRXX w/MML72-FEK Bezel) includes switch light 255a (an Idec pilot lamp, model no. AP8-AM-1-24VDC-Red) and is protected by circuit breaker 257 (a Potter Brumfield-circuit breaker, model no. W28XQ1A-5 w/55-025-B).

Electricity from power source 211 is converted from 120 volts alternating current to 24 volt direct current by power box/transformer 256. No-flavor switch 219 is closed when base mix flavor from the ice cream machine, such as vanilla, is desired with no flavoring from the flavor cabinet. Corresponding no-flavor light 221 is wired in series and is activated when switch 219 is closed. When a flavor from one of the syrup magazines 31a–h (FIG. 2) is desired, one of the corresponding flavor selector switches is closed. For example, flavor selector switch 253a (a Microswitch nine position, MML61K-9) is closed to provide syrup from corresponding syrup magazine 31a. When switch 253a is closed, relay coil 223a closes relay contact 227a, supplying current to pump motor 248a. Note that switch 253a also actuates flavor indicator light 251a, providing an indication on the control panel of which flavor is in use. Also note that relay coil 233a actuates relay contact 229a providing current to syrup out light 249 discussed below. Motor 248a drives a corresponding syrup pump to deliver syrup from the syrup magazine to the ice cream being dispensed.

As shown, switch 253b, relay coil 223b, flavor indicator light 251b, relay contacts 227b and 229b and motor 248b provide the same approach when a different flavor is selected. As seen, five of the eight parallel subcircuits for flavor selection have been omitted from the drawing as shown in dashed lines 202a and 202b. The circuit picks up again with substantially the same approach using switch 253h, relay coil 223h, relay contacts 227h and 229h, and pump motor 248h. Relays, such as relay coil 223a and contacts 227a and 229a are Idec Relays, model no. RH2B-VT-24VDC. Lights, such as light 251a, are Idec pilot lamps, model no. AP8-AM-1-24VDC-Amber.

Power box/transformer 256 is a Power One D.C. supply, model no. HD-24-4.8A, used to step voltage down to 24 volts, direct current. Note that the dashed line 200 above power box/transformer 256 denotes that the circuitry below the dashed line is physically located within cabinet 29.

Thus, by selecting the respective flavor selector switch, the operator may determine which pump will be driven to provide a respective flavor from one of the eight syrup magazines.

Spigot switch 225 may be manually overridden by closing manual switch 259. By so doing, relay coil 223i closes contact 227i and closes relay contact 231. In this way, flush switch 26l may be closed to flush the rotor chamber and syrup lines without having to activate spigot switch 225. By closing flush switch 261, relay coil 223j closes relay contact 233 and opens relay contact 235, as well as reclosing relay contact 231. Also, relay contact 237 is closed, providing currents to flush pump motor 259b. Flush pump motor 259b draws water from reservoir 63 (FIG. 2) to be flushed through the system while rotor motor 239 is operating.

When a syrup is selected in a contact, such as relay contact 229a, it is closed. Pressure sensor 241 detects fluid pressure in the corresponding syrup line. Current through time delay relay coil 243 closes time delay relay switch 245 if little or no fluid pressure is detected after a fixed time. Thus, when the syrup has run empty, syrup out light 249 (substantially corresponding to syrup out light 49 in FIG. 1) illuminate, indicating that there is no more of the selected syrup remaining in the magazine. Time delay relay coil 243 and switch 245 are an Idec time delay relay, model no. RTP-6A-A100-024 w/SR2P-06. A time delay of approximately 1–6 seconds is used to account for the delay between when the syrup pump is activated and when sufficient fluid pressure is built up to be detected by pressure sensor 241. Note that the embodiment shown may alternatively employ flow sensors or other means instead of pressure sensor 241 to accomplish a similar function.

Finally, note that dispensing solenoid 295 substantially corresponds to solenoid core 95 and solenoid body 77 in FIGS. 3–5.

Also note, it is possible to provide two devices as described above on either side of a single ice cream machine so as to provide sixteen flavors.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for combining one of a plurality of syrups with a frozen confection comprising:
   a rotor housing having a mixing chamber, a confection inlet to said mixing chamber, and a confection outlet from said mixing chamber, said rotor housing including not more than one syrup duct means for delivering syrup into said mixing chamber;
   a rotor positioned in said mixing chamber, said rotor having a central aperture therein;
   means for driving said rotor circumferentially around said central aperture;
   a plurality of syrup supply lines operably coupling said duct means to respective ones of the plurality of syrups; and means for pumping a syrup selected from the plurality of syrups through a corresponding one of said syrup supply lines and said syrup duct means and into said mixing chamber.

2. The device of claim 1 and further comprising flushing means for flushing said syrup duct means and said mixing chamber, said flushing means including a flushing duct operably connected to said syrup duct means and providing a flush flowing through said syrup duct means and into said mixing chamber.

3. The device of claim 2 wherein said mixing chamber has a central portion and circumferential portion radially outward thereof, ans wherein said syrup duct means includes an inwardly protruding syrup stem having a first syrup outlet located in said central portion of said mixing chamber.

4. The device of claim 1 wherein said mixing chamber has a central portion and circumferential portion radially outward thereof, and wherein said syrup duct means includes an inwardly protruding syrup stem having a first syrup outlet located in said central portion of said mixing chamber, wherein said means for driving said rotor includes a tangential drive on the rotor and wherin said first syrup outlet is positioned between said rotor and said confection inlet to said mixing chamber.

5. A device for combining one of a plurality of syrups with a frozen confection comprising:
a rotor housing having a mixing chamber, a confection inlet to said mixing chamber, and a confection outlet from said mixing chamber, said rotor housing including not more than one syrup duct means for delivering syrup into said mixing chamber;
a rotor positioned in said mixing chamber, said rotor having a central aperture therein;
means for driving said rotor;
a plurality of syrup supply lines operably coupling said duct means to respective ones of the plurality of syrups; and
means for pumping a syrup selected from the plurality of syrups through a corresponding one of said syrup supply lines and said syrup duct means and into said mixing chamber;
flushing means for flushing said syrup duct means and said mixing chamber, said flushing means including a flushing duct operably connected to said syrup duct means and providing a flush flowing through said syrup duct means and into said mixing chamber, wherein said mixing chamber has a central portion and circumferential portion radially outward thereof, and wherein said syrup duct means includes an inwardly protruding syrup stem having a first syrup outlet located in said central portion of said mixing chamber, and wherein said syrup stem further includes a second syrup outlet located radially outward of said first syrup outlet and in said circumferential portion of said mixing chamber.

6. The device of claim 5 wherein said means for driving said rotor includes a tangential drive.

7. The device of claim 6 wherein said first syrup outlet is positioned between said rotor and said confection inlet to said mixing chamber.

8. The device of claim 7 and further comprising means for coupling said rotor housing beneath a frozen confection machine outlet, wherein said rotor housing is removable from said machine outlet, and wherein said inlet to said mixing chamber is operably coupled to said machine outlet by said means for coupling.

9. The device of claim 8 and further comprising check valve means for regulating flow of the syrup through the syrup duct means.

10. A device for combining one of a plurality of syrups with a frozen confection comprising:
a rotor housing having a mixing chamber, a confection inlet to said mixing chamber, and a confection outlet from said mixing chamber, said rotor housing including not more than one syrup duct means for delivering syrup into said mixing chamber;
a rotor positioned in said mixing chamber, said rotor having a central aperture therein;
means for driving said rotor;
a plurality of syrup supplylines operably coupling said duct means to respective ones of the plurality of syrups; and
means for pumping a syrup selected from the plurality of syrups through a corresponding one of said syrup supply lines and said syrup duct means and into a said mixing chamber, wherein said mixing chamber has a central portion and circumferential portion radially outward thereof, and wherein said syrup duct means includes an inwardly protruding syrup stem having a first syrup outlet located in said central portion of said mixing chamber, wherein said means for driving said rotor includes a tangential drive, and wherein said first syrup outlet is positioned between said rotor and said confection inlet to said mixing chamber, and wherein said syrup stem further includes a second syrup outlet located radially outward of said first syrup outlet and in said circumferential portion of said mixing chamber.

11. A device for combining one of a plurality of syrups with a frozen confection comprising:
a rotor having a mixing chamber, a confection inlet to said mixing chamber, and a confection outlet from said mixing chamber, said mixing chamber including a central portion and circumferential portion radially outward thereof, said central portion including a center axis in the center of said mixing chamber and parallel with a flow direction of the confection between said confection inlet and said confection outlet;
a rotor positioned in said mixing chamber;
means for driving said rotor;
an inwardly protruding syrup stem having a first syrup outlet located in said center axis of said mixing chamber, said stem further including a syrup duct located therein;
at least one syrup supply line operably coupled to said syrup duct; and
means for pumping a syrup selected from the plurality of syrups through said syrup supply lines and said syrup duct and into said mixing chamber.

12. The device of claim 11 wherein said first syrup outlet is positioned between said rotor and said confection inlet to said mixing chamber, and wherein said means for driving said rotor includes a tangential drive on the rotor.

13. A device for combining one of a plurality of syrups with a frozen confection comprising:
a rotor housing having a mixing chamber, a confection inlet to said mixing chamber, and a confection outlet from said mixing chamber, said mixing chamber including a central portion and circumferential portion radially outward thereof;
a rotor positioned in said mixing chamber;

means for driving said rotor;

an inwardly protruding syrup stem having a first syrup outlet located in said central portion of said mixing chamber, said stem further including a syrup duct located therein;

at least one syrup supply line operably coupled to said syrup duct; and means for pumping a syrup selected from the plurality of syrups through said syrup supply line and said syrup duct and into said mixing chamber, wherein said syrup stem further includes a second syrup outlet located radially outward of said first syrup outlet and in said circumferential portion of said mixing chamber.

14. The device of claim 13 wherein said first syrup outlet is positioned between said rotor and said confection inlet to said mixing chamber.

15. The device of claim 14 wherein said means for driving said rotor includes a tangential drive.

16. A flavor dispensing device mountable below a frozen confection machine outlet comprising:

a removable rotor housing having a mixing chamber, a syrup duct means for delivering a syrup into said mixing chamber, a confection inlet to said mixing chamber, and a confection outlet from said mixing chamber;

means for coupling said rotor housing beneath the outlet of the frozen confection machine, said means for coupling including a coupling element engagable with said rotor housing and engagable with the frozen confection machine outlet, said coupling element being movable with respect to said rotor housing and with respect to said frozen confection machine outlet for disengagement and ready removal of said rotor housing from said frozen confection outlet, wherein said inlet to said mixing chamber is operably coupled to the oulet of the frozen confection machine by said means for coupling;

a rotor positioned in said mixing chamber;

means for tangetially driving said rotor;

at least one syrup supply line operably coupled to said syrup duct means; and means for pumping a syrup through said syrup supply line and said syrup duct means and into said mixing chamber.

17. The device of claim 16 wherein said mixing chamber has a central portion and circumferential portion radially outward thereof, and wherein said syrup duct means includes an inwardly protruding syrup stem having a first syrup outlet located in said central portion of said mixing chamber, said stem further including a syrup duct located therein.

18. The device of claim 17 and further comprising flushing means for flushing said syrup duct means and said mixing chamber, said flushing means including a flushing duct operably connected to said syrup duct means and providing a flush flowing through said syrup duct means and into said mixing chamber.

19. The device of claim 16 and further comprising a plurality of syrup supply lines operably coupled to said duct means, and wherein said syrup duct means includes not more than one syrup duct for delivering syrup into said mixing chamber.

20. A flavor dispensing device mountable below a frozen confection machine outlet comprising:

a removable rotor housing having a mixing chamber, a syrup duct means for delivering a syrup into said mixing chamber, a confection inlet to said mixing chamber, and a confection outlet from said mixing chamber;

means for coupling said rotor housing beneath the outlet of the frozen confection machine, wherein said inlet to said mixing chamber is operably coupled to the outlet of frozen confection machine by said means for coupling;

a rotor positioned in said mixing chamber;

means for tangentially driving said rotor;

at least one syrup supply line operably coupled to said syrup duct means;

means for pumping a syrup through said syrup supply line and said syrup duct means and into said mixing chamber; and a plurality of syrup supply lines operably coupled to said duct means, and wherein said syrup duct means includes not more than one syrup duct for delivering syrup into said mixing chamber, wherein said mixing chamber has a central portion and circumferential portion radially outward thereof, and wherein said syrup duct means includes an inwardly protruding syrup stem having a first syrup outlet located in said central portion of said mixing chamber and a second syrup outlet located radially outward of said first syrup outlet and in said circumferential portion of said mixing chamber, wherein said first syrup outlet is positioned between said rotor and said confection inlet to said mixing chamber, and wherein said rotor has a central aperture therein.

21. A device for combining syrup with a frozen confection comprising:

a rotor housing having a mixing chamber, a confection inlet to said mixing chamber, and a confection outlet from said mixing chamber, said confection inlet and said confection outlet defining a confection flow path therebetween;

a rotor positioned in said mixing chamber for engaging the frozen confection, said rotor having an unobstructed central aperture therein, said rotor having a generally circular outer profile around said central aperture, said central aperture being aligned to receive said confection flow path therethrough;

means for tangentially driving said rotor circumferentially around said central aperture, said means for driving engaging said generally circular outer profile of said rotor; and syrup supply means for supplying syrup to said mixing chamber.

22. The device of claim 21 wherein said mixing chamber includes a central portion and circumferential portion radially outward thereof, said central portion including a center axis in the center of said mixing chamber and parallel with a flow direction of the confection between said confection inlet and said confection outlet, and wherein said syrup supply means includes an inwardly protruding syrup stem having a first syrup outlet located in said center axis of said mixing chamber.

23. The device of claim 21 wherein said syrup supply means includes a single syrup duct for supplying syrup into said mixing chamber and further includes a plurality of syrup supply lines coupled to said single syrup duct for selective supplying of syrup to said single syrup duct.

* * * * *